US009395069B2

(12) United States Patent
Huang et al.

(10) Patent No.: US 9,395,069 B2
(45) Date of Patent: Jul. 19, 2016

(54) LAMP

(71) Applicants: Chih-Hung Huang, New Taipei (TW); Chung-Ping Lai, New Taipei (TW); Ming-Hong Yeh, New Taipei (TW)

(72) Inventors: Chih-Hung Huang, New Taipei (TW); Chung-Ping Lai, New Taipei (TW); Ming-Hong Yeh, New Taipei (TW)

(73) Assignee: Optoma Corporation, New Taipei (TW)

( * ) Notice: Subject to any disclaimer, the term of this patent is extended or adjusted under 35 U.S.C. 154(b) by 110 days.

(21) Appl. No.: 14/296,471

(22) Filed: Jun. 5, 2014

(65) Prior Publication Data

US 2015/0354788 A1 Dec. 10, 2015

(51) Int. Cl.

| | |
|---|---|
| ***B60Q 1/124*** | (2006.01) |
| ***F21V 21/096*** | (2006.01) |
| ***F21S 2/00*** | (2016.01) |
| ***F21S 9/02*** | (2006.01) |
| *F21W 121/00* | (2006.01) |
| *F21Y 101/02* | (2006.01) |

(52) U.S. Cl.

CPC ................. *F21V 21/096* (2013.01); *F21S 2/00* (2013.01); *F21S 9/02* (2013.01); *F21W 2121/00* (2013.01); *F21Y 2101/02* (2013.01)

(58) Field of Classification Search

CPC ..... F21V 14/00; F21V 17/105; F21V 17/096; F21V 23/06; F21V 21/15; F21V 3/049; F21W 2111/00; F21L 2/00; F21L 4/08

USPC .................................. 362/233, 183, 157, 154

See application file for complete search history.

(56) References Cited

U.S. PATENT DOCUMENTS

| | | | | |
|---|---|---|---|---|
| 5,147,132 A * | 9/1992 | Lee | F21V 21/26 | 362/288 |
| 2010/0327766 A1* | 12/2010 | Recker | H02J 9/02 | 315/291 |
| 2014/0328054 A1* | 11/2014 | Andersen | F21L 4/00 | 362/202 |
| 2015/0198317 A1* | 7/2015 | Feller | G08B 5/36 | 362/249.01 |

FOREIGN PATENT DOCUMENTS

| | | |
|---|---|---|
| TW | M394412 | 12/2010 |
| TW | M399368 | 3/2011 |
| TW | M407351 | 7/2011 |
| TW | M432456 | 7/2012 |
| TW | M474882 | 3/2014 |

OTHER PUBLICATIONS

Holi, "The first iPhone-iPad controlled LED Lamp," available at http://www.holimotion.com/holi-lamp/ (retrieved on May 12, 2014).

* cited by examiner

*Primary Examiner* — Evan Dzierzynski
*Assistant Examiner* — Matthew Peerce
(74) *Attorney, Agent, or Firm* — Jianq Chyun IP Office

(57) ABSTRACT

A lamp is provided. The lamp has one of a first connection portion and a second connection portion. Another one of the first connection portion and the second connection portion belongs to another lamp. The first connection portion has a first electrode set, the second connection portion has a second electrode set, and the first electrode set and the second electrode set contact each other when the lamp and the another lamp are stacked each other.

20 Claims, 8 Drawing Sheets

LAMP

BACKGROUND

1. Technical Field

The invention relates to a lamp, and more particularly, to a lamp for providing scene light.

2. Background

With regard to illuminating lamps, some of illuminating lamps not only provides illumination function, but also provides decoration or scene light function. Generally, an illuminating lamp performs scene light function by changing light emitting color or changing light emitting intensity. However, users want more than the above-mentioned scene light experiences. For this reason, it becomes an issue requiring an immediate action as to how to make the scene light more variable for providing the users more pleasant and high quality scene light experiences.

Taiwan Patent No. M432456 discloses a plurality of electrical bricks assembled on a conductive substrate, for providing electrical power to the LED element. Taiwan Patent No. M394412 discloses a plurality of lamp units stacked together by magnetic attraction generated between magnetic components. Taiwan Patent No. M407351 discloses a lamp adapted to turn on the LED element by operation of a permanent magnet. Taiwan Patent No. M474882 discloses a lamp includes a plurality of lamp units connected sequentially for emitting lights by turning on one of the lamp units. Taiwan Patent No. M399368 discloses a plurality of LED units disposed on a back side of a display to provide scene light. The conventional skill art discloses a method for providing the scene effect by the lamp though executing the application in mobile phone connected wirelessly to the lamp.

SUMMARY OF THE INVENTION

The invention is directed to a lamp, and lamp units thereof are adapted to be stacked together based on user's demand, so as to make the scene light more variable.

A lamp has one of a first connection portion and a second connection portion. Another one of the first connection portion and the second connection portion belongs to another lamp. The first connection portion has a first electrode set, the second connection portion has a second electrode set, and the first electrode set and the second electrode set contact each other when the lamp and the another lamp are stacked each other. The lamp may have a magnetic component, and the lamp may be stacked to an object by magnetic attraction generated between the magnetic component and the object. The lamp may further comprise a main body, a cover and a light source. A main body may have a front side and a rear side opposite to each other, and a cover may cover the main body and a light source disposed at the front side of the main body, wherein a light emitted by the light source passes through the cover to reach an external space. The lamp may further comprise an electric power storage unit and is adapted to store electric power in the electric power storage unit.

A lamp includes a first lamp unit and at least one second lamp unit. The first lamp unit has one of a first connection portion and a second connection portion. The second lamp unit has another one of the first connection portion and the second connection portion. The first connection portion has a first electrode set, the second connection portion has a second electrode set, and the first electrode set and the second electrode set contact each other when the first lamp unit and the second lamp unit are stacked each other.

Based on the above, in the embodiment of the invention, the lamp units of the lamp are adapted to be stacked together based on user's demand. Therefore, the lamp units having different light emitting colors, different light emitting intensities and/or different light emitting directions are stacked together to make the scene light of the lamp more variable, so as to provide users more pleasant and high quality scene light experiences.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
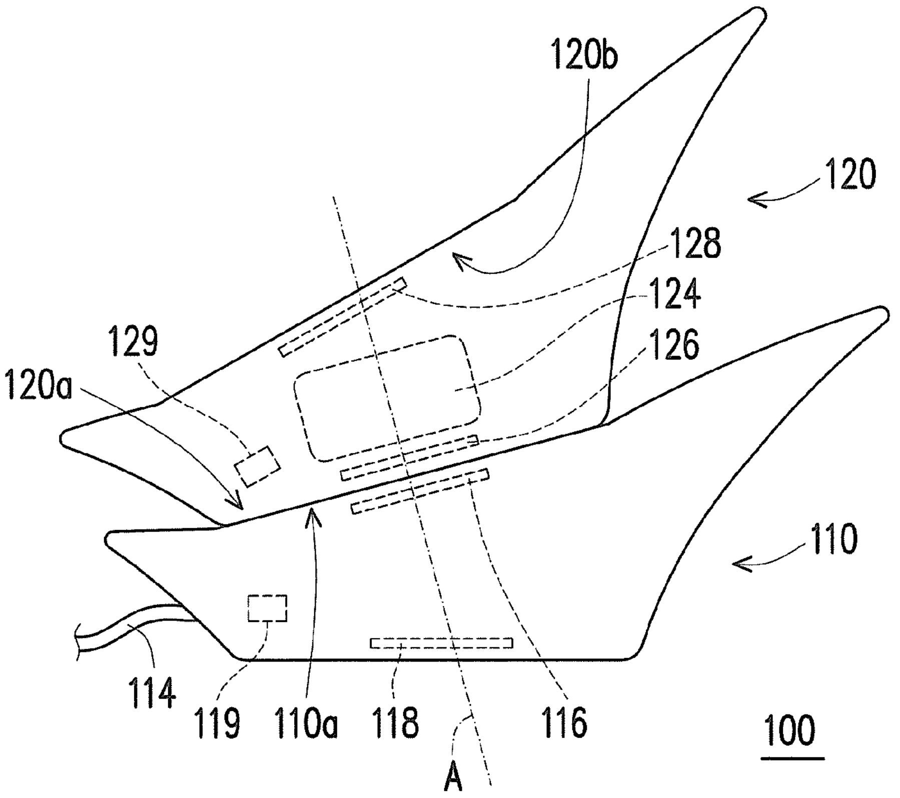
FIG. 1 is a side view of first and second lamp units of a lamp according to one embodiment of the invention.
Figure 2:
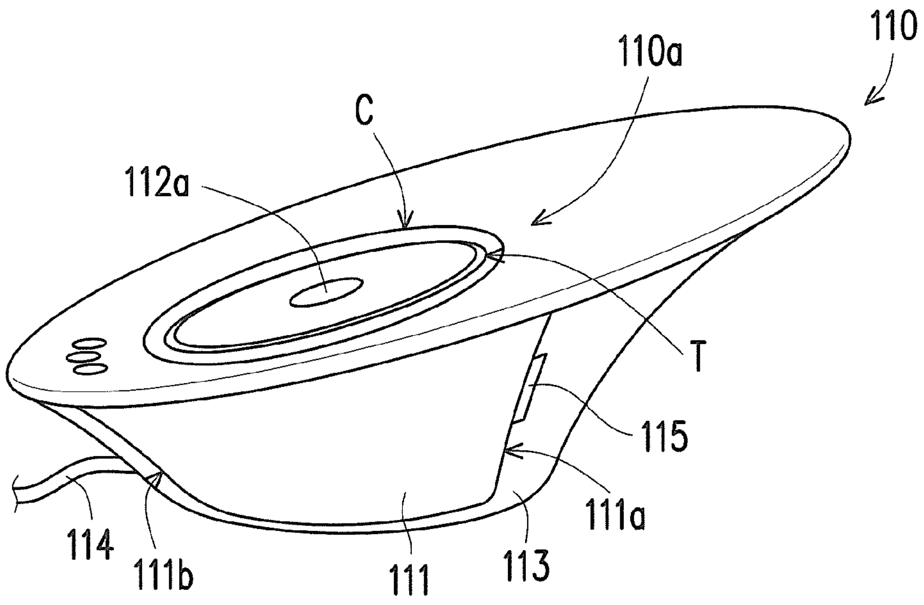
FIG. 2 is a stereoscopic schematic view of the first lamp unit of FIG. 1.
Figure 3:
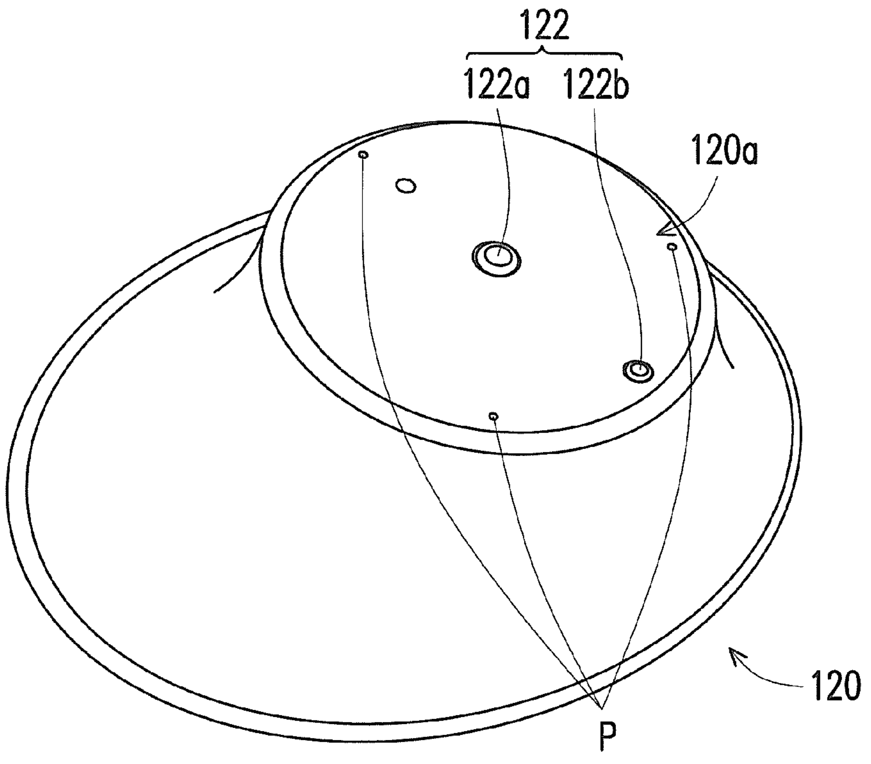
FIG. 3 is a stereoscopic schematic view of the second lamp unit of FIG. 1.

Referring to FIG. 1 to FIG. 3, a lamp 100 of the embodiment includes a first lamp unit 110 and at least one second lamp unit 120 (one second lamp unit 120 is shown, for example). The first lamp unit 110 has a first connection portion 110*a*. The second lamp unit 120 has a second connection portion 120*a*. The first lamp unit 110 and the second lamp unit 120 are adapted to be stacked each other by the first connection portion 110*a* and the second connection portion 120*a* as shown in FIG. 1.

Figure 4:
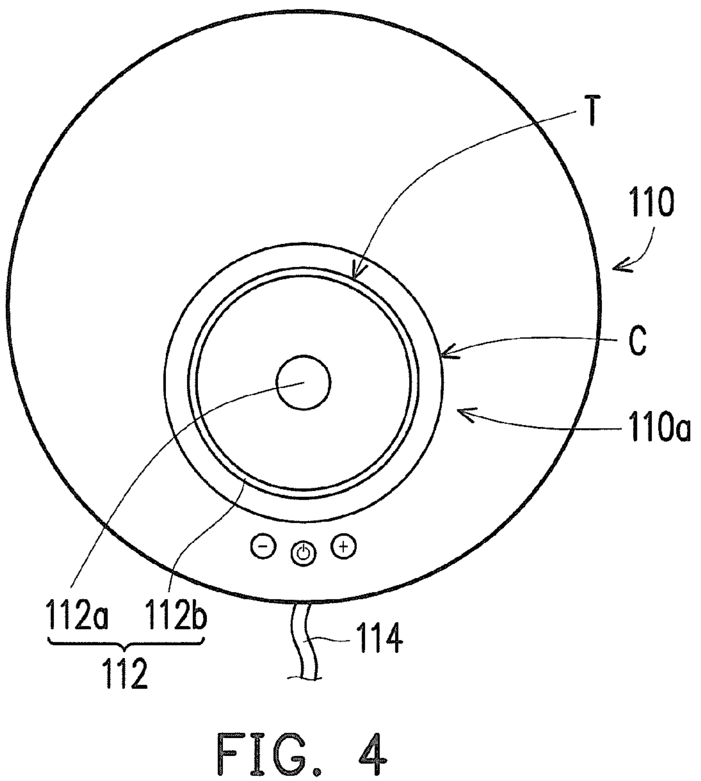
FIG. 4 is a top view of the first lamp unit of FIG. 1.
Figure 5:
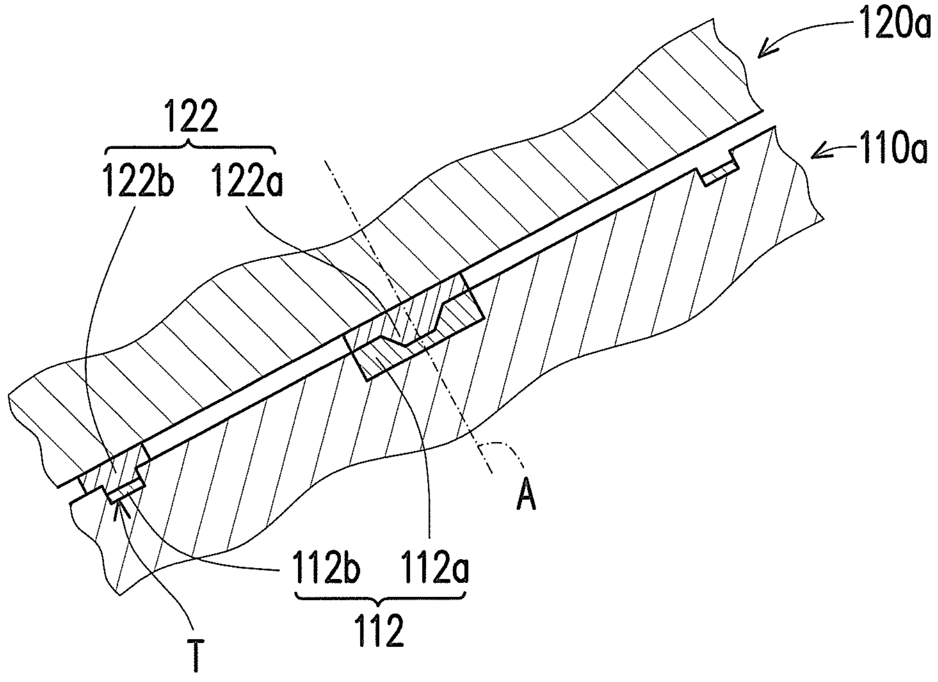
FIG. 5 is a partial cross-sectional view of the lamp of FIG. 1.

Referring to FIG. 3 to FIG. 5, particularly, the first connection portion 110*a* has a first electrode set 112, the second connection portion 120*a* has a second electrode set 122, and the first electrode set 112 and the second electrode set 122 contact each other as shown in FIG. 5 when the first lamp unit 110 and the second lamp unit 120 are stacked each other.

In the embodiment, the first lamp unit 110 further has a power cord 114 and is adapted to receive an electric power provided by an external power source through the power cord 114. The first lamp unit 110 is adapted to transmit the electric power to the second lamp unit 120 through the first electrode set 112 and the second electrode set 122. The second lamp unit 120 further has an electric power storage unit 124 as shown in FIG. 1. In the other embodiment, the power cord 114 may disassemble from the first lamp unit 110 to connect with the second lamp unit 120 for transmitting the electric power. The electric power storage unit 124 is, for example, a charge battery. The first lamp unit 110 and the second lamp unit 120 are adapted to store the electric power in the electric power storage unit 124.

According to the above configuration, the first lamp unit 110 and the second lamp unit 120 are adapted to be stacked together based on user's demand. Therefore, the first lamp unit 110 and the second lamp unit 120 having different light emitting colors, different light emitting intensities and/or different light emitting directions are stacked together to make the scene light of the lamp more variable, so as to provide users more pleasant and high quality scene light experiences.

Referring to FIG. 1, the first connection portion 110*a* and the second connection portion 120*a* further has a first magnetic component 116 and a second magnetic component 126 respectively. The first magnetic component 116 and the second magnetic component 126 are, for example, permanent magnets, and the first lamp unit 110 and the second lamp unit 120 are fixed together by magnetic attraction generated between the first magnetic component 116 and the second magnetic component 126.

Figure 6:
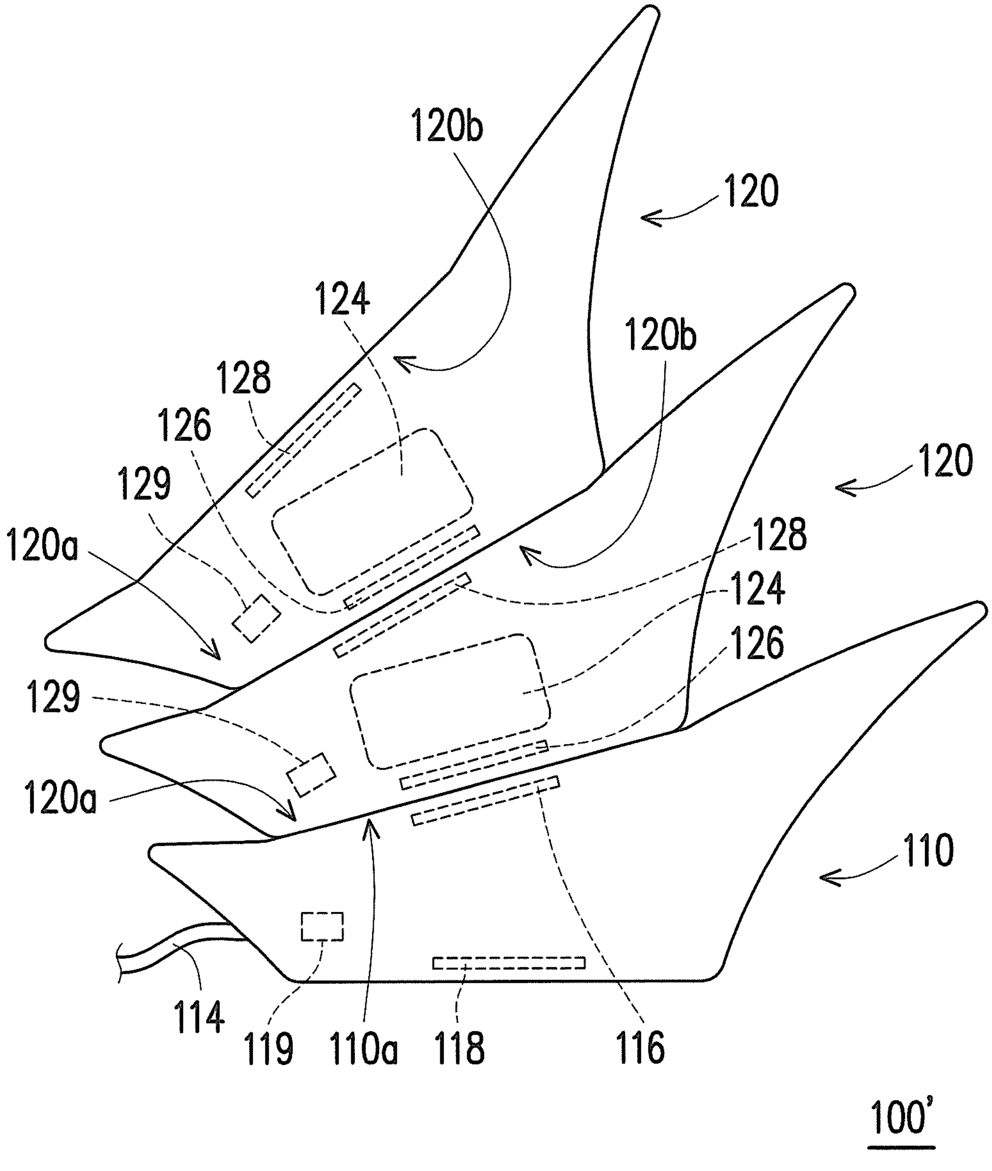
FIG. 6 is a side view of first and second lamp units of a lamp according to another embodiment of the invention.
Figure 7:
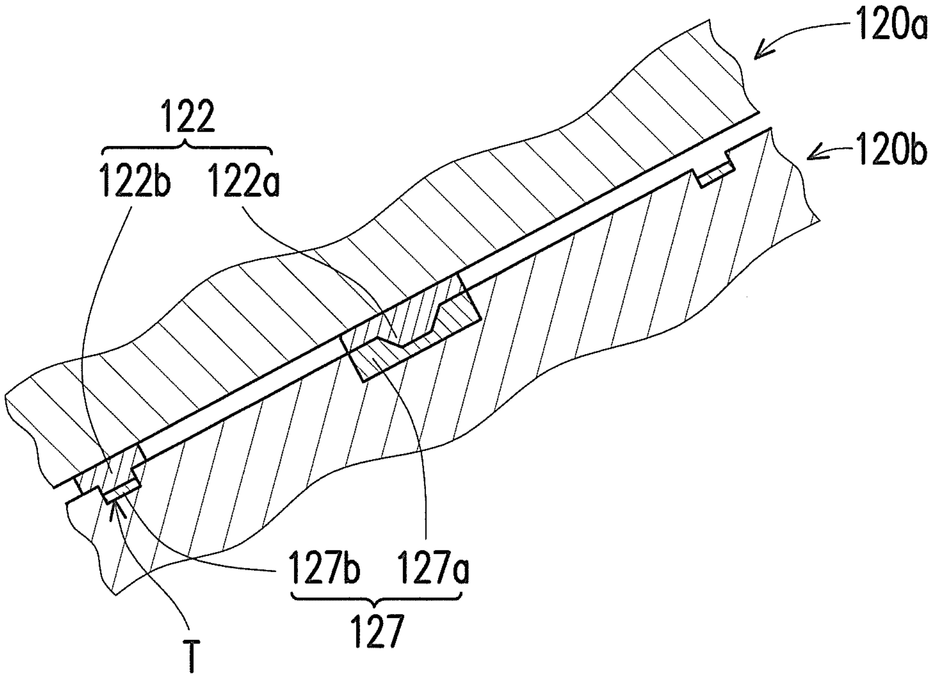
FIG. 7 is a partial cross-sectional view of the lamp of FIG. 6.

Referring to FIG. 6 and FIG. 7, in this embodiment, the lamp 100' includes a plurality of second lamp units 120 (two second lamp units 120 are shown in FIG. 6 for example). Each of the second lamp units 120 further has a third connection portion 120*b*, and each second connection portion 120*a* and each third connection portion 120*b* are disposed at two opposite sides of each of the second lamp units 120. The third connection portion 120*b* has a third electrode set 127 and a third magnetic component 128. When the second lamp units 120 are sequentially stacked on the first lamp unit 110 as shown in FIG. 6, two of the second lamp units 120 adjacent to each other are stacked together by magnetic attraction generated between the corresponding second magnetic component 126 and the corresponding third magnetic component 128, and two of the second lamp units 120 adjacent to each other contact each other by the corresponding second electrode set 122 having a third electrode 122*a* and a fourth electrode 122*b* and the corresponding third electrode set 127 having electrodes 127*a* and 127*b* respectively corresponding to the third electrode 122*a* and the fourth electrode 122*a* for electric power transmission. In other embodiments, the lamp may include three, four or more second lamp units sequentially stacked on the first lamp unit, and the invention is not limited thereto.

Figure 8:
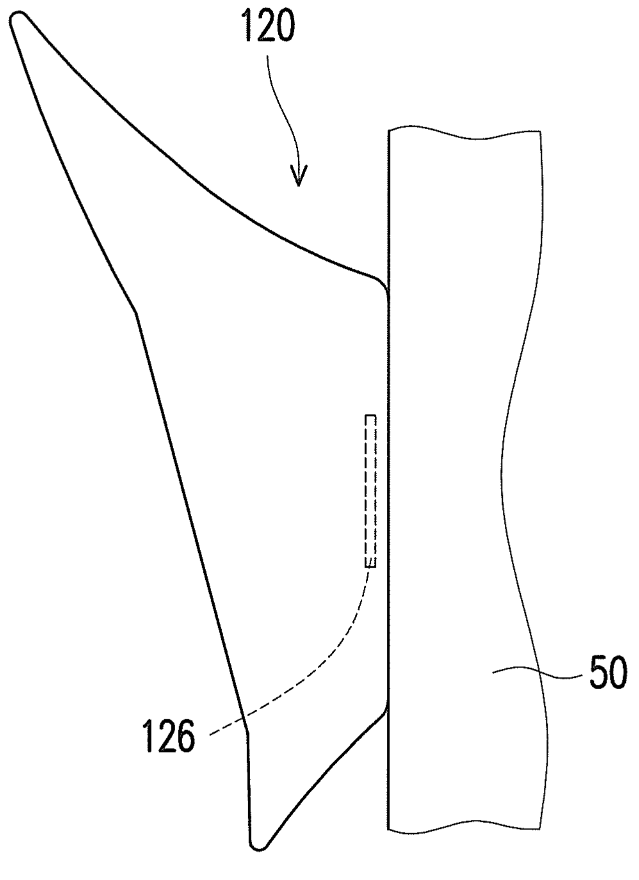
FIG. 8 is a side view of the second lamp unit of FIG. 1 being fixed to an object.

Referring to FIG. 8, the second lamp unit 120 is adapted to be stacked to an object 50 as shown in FIG. 8 by magnetic attraction generated between the second magnetic component 126 and the object 50 in the embodiment. In addition, the first lamp unit 110 shown in FIG. 1 has a fourth magnetic component 118, and the first lamp unit 110 is also adapted to be stacked to the object 50 by magnetic attraction generated between the fourth magnetic component 118 and the object 50 in the other embodiment. The object 50 is, for example, a metal plate, a magnetic plate, or other suitable structure.

Referring to FIG. 2 and FIG. 4, in the embodiment, the first connection portion 110*a* further has a position-limiting concave portion C, the first electrode set 112 is located in the position-limiting concave portion C. When the first lamp unit 110 and the second lamp unit 120 are stacked each other as shown in FIG. 1, the second connection portion 120*a* is limited in the position-limiting concave portion C, so as to further fix the second lamp unit 120 on the first lamp unit 110.

In the embodiment, when the first lamp unit 110 and the second lamp unit 120 are stacked each other as shown in FIG. 1, the first lamp unit 110 and the second lamp unit 120 are adapted to rotate relatively along a rotating axis A. When the first lamp unit 110 and the second lamp unit 120 stacked each other rotate relatively along the rotating axis A, a light emitting direction of the second lamp unit 120 is changed relative to a light emitting direction of the first lamp unit 110, so as to further make the scene light of the lamp 100 more variable. Similarly, in the other embodiment, the adjacent second lamp units 120 in FIG. 6 are also adapted to rotate relatively to change relative light emitting directions thereof.

Referring to FIG. 3 to FIG. 5, particularly, the first electrode set 112 includes a first electrode 112*a* and a second electrode 112*b*, and the second electrode set 122 includes the third electrode 122*a* and the fourth electrode 122*b*. The first electrode 112*a* and the second electrode 112*b* are, for example, anode and cathode respectively. The third electrode 122*a* and the fourth electrode 122*b* are, for example, anode and cathode respectively.

In the embodiment, in FIGS. 1-5, the first connection portion 110*a* of the first lamp unit 110 further has a ring-shaped trough T, and the second electrode 112*b* is a ring-shaped electrode and is located in the ring-shaped trough T. When the first lamp unit 110 and the second lamp unit 120 are stacked each other and relatively rotate along the rotating axis A, the first electrode 112*a* and the third electrode 122*a* are located on the rotating axis A and contact each other continuously, and the fourth electrode 122*b* inserts into the ring-shaped trough T and moves along and continuously contact the ring-shaped electrode (the second electrode 112*b*) with a relative rotation of the first lamp unit 110 and the second lamp unit 120. Similarly, in the other embodiment, in FIGS. 6-7, the third connection portion 120*b* of the second lamp unit 120 further has a ring-shaped trough T, and the electrode 127*b* of the third electrode set 127 is a ring-shaped electrode and is located in the ring-shaped trough T. When second lamp units 120 are stacked each other and relatively rotate, the electrode 127*a* and the third electrode 122*a* are located on the rotating axis and contact each other continuously, and the fourth electrode 122*b* inserts into the ring-shaped trough T and moves along and continuously contacts the ring-shaped electrode (the electrode 127*b*) with the relative rotation(s) of second lamp units 120.

Figure 9:
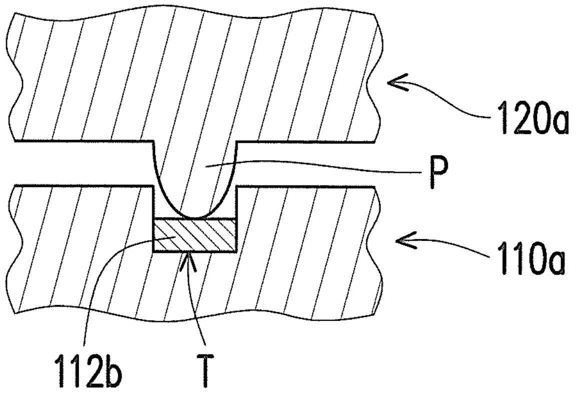
FIG. 9 is a partial cross-sectional view of the lamp of FIG. 1.

Referring to FIG. 3 and FIG. 9, the second connection portion 120*a* further has at least one pillar P (three pillars P are shown in FIG. 3 for example). When the first lamp unit 110 and the second lamp unit 120 are stacked each other, each pillar P inserts into the ring-shaped trough T and props the ring-shaped electrode (the second electrode 112*b*), and each pillar P is adapted to move along the ring-shaped trough T with the relative rotation of the first lamp unit 110 and the second lamp unit 120. By the pillars P propping the second electrode 112*b*, contact force between the second electrode 112*b* and the fourth electrode 122*b* may be decreased, so as to lower friction between the second electrode 112*b* and the fourth electrode 122*b* contacting each other and moving relatively. Similarly, in the other embodiment, for stacked second lamp units 120, the corresponding second connection portion 120*a* with the pillar(s) P inserting into the corresponding ring-shaped trough T and propping the corresponding ring-shaped electrode 127*b* of the third electrode set (127 shown in FIG. 7 for example) may also be utilized to decrease the contact force between two adjacent second lamp units 120.

Figure 10:
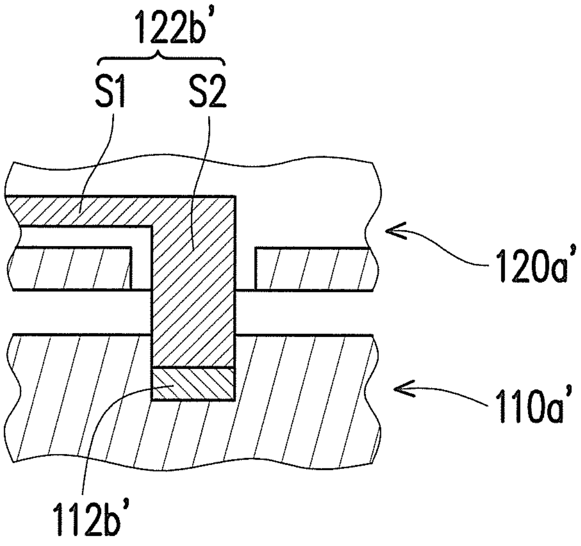
FIG. 10 is a partial cross-sectional view of a lamp according to another embodiment.

In the embodiment of FIG. 10, the configuration and operation of the first connection portion 110*a*', the second connection portion 120*a*', and the second electrode 112*b*' are similar to the configuration and operation of the first connection portion 110*a*, the second connection portion 120*a*, and the second electrode 112*b* in FIG. 5. The difference between FIG. 10 and FIG. 5 is that, the fourth electrode 122*b*' includes an elastic portion S1 and a contacting portion S2 connected to each other, and the contacting portion S2 is adapted to lean against the ring-shaped electrode (the second electrode 112*b*') by elastic force of the elastic portion S1, such that the fourth electrode 122*b*' may contact the second electrode 112*b*' tightly for increasing the stability between the first lamp unit 110 and the second lamp unit 120. Similarly, in the other embodiment, two adjacent stacked second lamp units 120 may also utilize the contact relation between the corresponding fourth electrode (122*b* shown in FIG. 7 for example) having the elastic portion S1 and a contacting portion S2 of the second electrode set (122 shown in FIG. 7 for example) and the corresponding electrode 127*b* of the third electrode set (127 shown in FIG. 7 for example) to tightly contact each other to further achieve the increased stability.

Referring to FIG. 2, in the embodiment, the first lamp unit 110 includes a main body 111, a cover 113, and a light source 115. The main body 111 has a front side 111*a* and a rear side 111*b* opposite to each other. The cover 113 coves the main body 111. The light source 115 is, for example, a light emitting diode (LED) light source and disposed at the front side 111*a*. A light emitted by the light source 115 passes through the cover 113 to reach external space. In the embodiment, the light emitting intensity at the front side 111*a* is substantially higher than the light emitting intensity at the rear side 111*b*. In another embodiment, the cover 113 is, for example, a diffuser, and the light is diffused from the front side 111*a* to the rear side 111*b* by the cover 113, such that the light emitted by the light source 115 is substantially uniform around the first lamp unit 110. In the other embodiment, the cover 113 is, for example, a semi-transparent cover, and the light may not be sharp to achieve the smoother scene effect.

Figure 11:
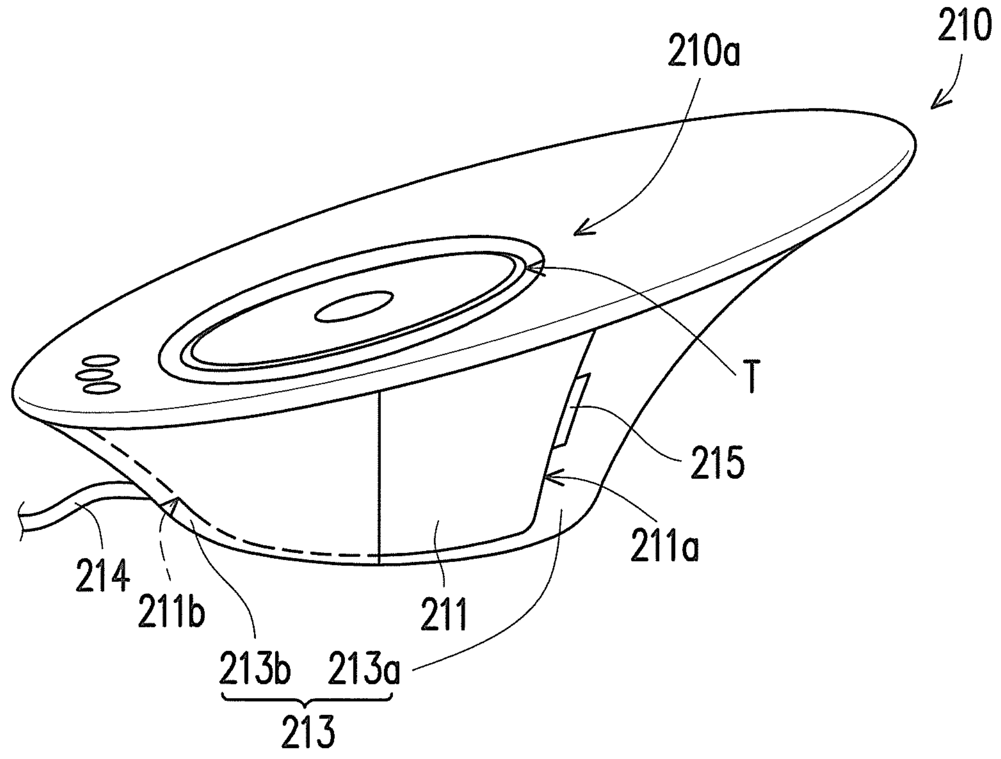
FIG. 11 is a stereoscopic schematic view of a first lamp unit according to another embodiment.

Referring to FIG. 11, in the first lamp unit 210 of FIG. 11, the configuration and operation of the first connection portion 210*a*, the main body 211, the light source 215 and the power cord 214 are similar to the configuration and operation of the first connection portion 110*a*, the main body 111, the light source 115 and the power cord 114 in FIG. 2. The difference between FIG. 11 and FIG. 2 is that, the cover 213 includes a light penetration portion 213*a* corresponding to the front side 211*a* of the main body 211 and a light shielding portion 213*b* corresponding to the rear side 211*b* of the main body 211. Therefore, the light emitted by the light source 215 will not reach external space through the rear portion of the cover 213.

Similarly, the above-mentioned second lamp unit 120 includes a main body, a cover, and a light source, and the configuration and operation thereof are similar to the configuration and operation of the main body 111, the cover 113, and light source 115 in FIG. 2 or the configuration and operation of the main body 211, the cover 213, and light source 215 in FIG. 11, a relevant description thereof is not repeated herein.

Referring to FIG. 1, in the embodiment, the first lamp unit 110 further has a wireless transmission module 119, and an external device (for example, a smart phone, tablet computer, notebook or PC, and etc) is adapted to transmit a wireless signal to the wireless transmission module 119 to control a light emitting color and/or a light emitting intensity of the first lamp unit 110. Similarly, the second lamp unit 120 further has a wireless transmission module 129, and the external device is adapted to transmit a wireless signal to the wireless transmission module 129 to control a light emitting color and/or a light emitting intensity of the second lamp unit 120. The wireless transmission module 119 and the wireless transmission module 129 are, for example, Bluetooth module or other type of wireless transmission module, and the invention is not limited thereto.

In summary, in the embodiment of the invention, the lamp units of the lamp are adapted to be stacked together based on user's demand. Therefore, the lamp units having different light emitting colors, different light emitting intensities and/or different light emitting directions are stacked together to make the scene light of the lamp more variable, so as to provide users more pleasant and high quality scene light experiences. In addition, in the embodiment of the invention, when the lamp units are stacked together, the lamp units are adapted to rotate relatively, so as to further make the scene light of the lamp more variable. Further, in the embodiment of the invention, the lamp units may include magnetic components and be stacked together by magnetic attraction generated between the magnetic components, such that each lamp unit is prevented from being separated from other lamp units unexpectedly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", "third", "fourth", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lamp, comprising:

one of a first connection portion and a second connection portion, wherein another one of the first connection portion and the second connection portion belongs to another lamp, wherein the first connection portion has a first electrode set, the second connection portion has a second electrode set, and the first electrode set and the second electrode set contact each other when the lamp and the another lamp are stacked each other, wherein the first electrode set comprises a first electrode and a second electrode, the second electrode set comprises a third electrode and a fourth electrode, and the second electrode is a ring-shaped electrode, wherein the first connection portion further has a ring-shaped trough, the ring-shaped electrode is located in the ring-shaped trough, and the fourth electrode is adapted to insert into the ring-shaped trough and contact the ring-shaped electrode.

2. The lamp according to claim 1, further comprising a magnetic component, and the lamp is stacked to an object by magnetic attraction generated between the magnetic component and the object.

3. The lamp according to claim 1, further comprising:

a main body, has a front side and a rear side opposite to each other;

a cover, covering the main body; and a light source, disposed at the front side, wherein a light emitted by the light source passes through the cover to reach an external space.

4. The lamp according to claim 1, further comprising an electric power storage unit and is adapted to store electric power in the electric power storage unit.

5. The lamp according to claim 1, wherein the second connection portion further has at least one pillar, the pillar inserts into the ring-shaped trough and props the ring-shaped electrode and the pillar is adapted to move along the ring-shaped trough when the first lamp unit and the second lamp unit are stacked each other.

6. A lamp, comprising:

a first lamp unit, having one of a first connection portion and a second connection portion; and at least one second lamp unit, having another one of the first connection portion and the second connection portion, wherein the first connection portion has a first electrode set, the second connection portion has a second electrode set, and the first electrode set and the second electrode set contact each other when the first lamp unit and the second lamp unit are stacked each other, wherein the first electrode set comprises a first electrode and a second electrode, the second electrode set comprises a third electrode and a fourth electrode, and the second electrode is a ring-shaped electrode, wherein the first connection portion further has a ring-shaped trough, the ring-shaped electrode is located in the ring-shaped trough, and the fourth electrode is adapted to insert into the ring-shaped trough and contact the ring-shaped electrode.

7. The lamp according to claim 6, wherein the first lamp unit and the second lamp unit are stacked each other, the first lamp unit and the second lamp unit are adapted to rotate relatively along a rotating axis.

8. The lamp according to claim 6, wherein the first connection portion further has a position-limiting concave portion, the first electrode set is located in the position-limiting concave portion and the second connection portion is limited in the position-limiting concave portion when the first lamp unit and the second lamp unit are stacked each other.

9. The lamp according to claim 6, wherein the first electrode and the second electrode respectively contact the third electrode and the fourth electrode continuously when the first lamp unit and the second lamp unit are stacked each other and relatively rotate along a rotating axis.

10. The lamp according to claim 9, wherein the first electrode and the third electrode are located on the rotating axis and contact each other and the fourth electrode moves along and continuously contact the ring-shaped electrode when the first lamp unit and the second lamp unit are stacked each other and relatively rotate along the rotating axis.

11. The lamp according to claim 10, wherein the fourth electrode comprises an elastic portion and a contacting portion connected to each other, and the contacting portion is adapted to lean against the ring-shaped electrode by elastic force of the elastic portion.

12. The lamp according to claim 6, wherein the first connection portion and the second connection portion further has a first magnetic component and a second magnetic component respectively, and the first lamp unit and the second lamp unit are fixed together by magnetic attraction generated between the first magnetic component and the second magnetic component.

13. The lamp according to claim 12, wherein a quantity of the at least one second lamp unit is plural, each of the second lamp units further has a third connection portion, each second connection portion and each third connection portion are disposed at two opposite sides of each of the second lamp units, the third connection portion has a third electrode set and a third magnetic component, two of the second lamp units adjacent to each other are fixed together by magnetic attraction generated between the corresponding second magnetic component and the corresponding third magnetic component and two of the second lamp units adjacent to each other contact each other by the corresponding second electrode set and the corresponding third electrode set when the second lamp units are sequentially stacked on the first lamp unit.

14. The lamp according to claim 6, wherein at least one of the first lamp unit and the second lamp unit comprises:

a main body, has a front side and a rear side opposite to each other;

a cover, covering the main body; and a light source, disposed at the front side, wherein a light emitted by the light source passes through the cover to reach an external space.

15. The lamp according to claim 14, wherein the cover is a diffuser.

16. The lamp according to claim 14, wherein the cover comprises a light penetration portion corresponding to the front side and a light shielding portion corresponding to the rear side.

17. The lamp according to claim 6, wherein when the first lamp unit and the second lamp unit are stacked each other and rotate relatively along a rotating axis, a light emitting direction of the second lamp unit is changed relative to a light emitting direction of the first lamp unit.

18. The lamp according to claim 6, wherein at least one of the first lamp unit and the second lamp unit further has a wireless transmission module, and an external device is adapted to transmit a wireless signal to the wireless transmission module to control a light emitting color and/or a light emitting intensity of at least one of the first lamp unit and the second lamp unit.

19. The lamp according to claim 6, wherein the first lamp unit further has a power cord and is adapted to receive the electric power provided by an external power source through the power cord.

20. The lamp according to claim 6, wherein the second lamp unit further has an electric power storage unit and is adapted to store the electric power in the electric power storage unit.

* * * * *